US008024610B2

(12) United States Patent
de Kleer

(10) Patent No.: US 8,024,610 B2
(45) Date of Patent: Sep. 20, 2011

(54) DIAGNOSING INTERMITTENT FAULTS

(75) Inventor: Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 134 days.

(21) Appl. No.: 11/940,493

(22) Filed: Nov. 15, 2007

(65) Prior Publication Data

US 2008/0294578 A1 Nov. 27, 2008

Related U.S. Application Data

(60) Provisional application No. 60/931,524, filed on May 24, 2007, provisional application No. 60/931,526, filed on May 24, 2007.

(51) Int. Cl.
*G06F 11/00* (2006.01)
(52) U.S. Cl. ............................................. 714/26; 714/33
(58) Field of Classification Search .................... 714/26, 714/33
See application file for complete search history.

(56) References Cited

U.S. PATENT DOCUMENTS

| | | | |
|---|---|---|---|
| 4,766,595 A * | 8/1988 | Gollomp ........................ 714/33 |
| 5,293,323 A | 3/1994 | Doskocil et al. | |
| 6,167,352 A * | 12/2000 | Kanevsky et al. ............. 702/81 |
| 6,230,109 B1 | 5/2001 | Miskimins et al. | |
| 6,347,388 B1 | 2/2002 | Hollander | |
| 6,484,135 B1 | 11/2002 | Chin et al. | |
| 6,675,138 B1 | 1/2004 | Hollander et al. | |
| 6,751,536 B1 | 6/2004 | Kiperstok et al. | |
| 6,947,797 B2 * | 9/2005 | Dean et al. ...................... 700/79 |
| 7,356,443 B2 * | 4/2008 | Barford ......................... 702/183 |
| 2002/0166089 A1 | 11/2002 | Noy | |
| 2002/0193920 A1 | 12/2002 | Miller et al. | |
| 2005/0060132 A1 | 3/2005 | Hollander et al. | |
| 2005/0138493 A1 * | 6/2005 | Barford .......................... 714/712 |
| 2005/0251364 A1 | 11/2005 | Kang et al. | |
| 2006/0106743 A1 * | 5/2006 | Horvitz ............................ 706/21 |

OTHER PUBLICATIONS

Blom et al "Diagnosing Intermittent Faults in Telecommunication Networks" 1992 IEEE pp. 544-548.*
U.S. Appl. No. 11/928,444, filed Oct. 30, 2007, de Kleer.
U.S. Appl. No. 11/942,234, filed Nov. 19, 2007, de Kleer.
U.S. Appl. No. 11/775,650, filed Jul. 10, 2007, de Kleer.
Int'l Search Report, PCT/US07/85527, Dated May 22, 2008, Authorized Office Lee W. Young.

(Continued)

*Primary Examiner* — Bryce Bonzo
(74) *Attorney, Agent, or Firm* — Fay Sharpe LLP

(57) ABSTRACT

A method and system for diagnosing any combination of persistent and intermittent faults. The behavior of a system under test is obtained by measuring or probing the system at a particular location(s). The predicted behavior of a modeled system corresponding to the system under test is investigated by drawing inferences based on at least conditional probabilities, prior observations and component models. The predictions are compared to their corresponding points in the system under test. A determination is made if a conflict exists between the measured behavior and the predicted behavior, and the conditional probabilities are adjusted to more and more accurately reflect the action fault(s) in the system under test. The conflicts or deviations between the obtained predicted behavior and the actual behavior are used to isolate the components of the system causing the faults.

21 Claims, 10 Drawing Sheets

OTHER PUBLICATIONS

De Kleer et al., "Model-Based Diagnosis in SOPHIE III", pp. 179-205 [This paper integrates excerpts from a number of earlier papers, two of which are: Pedagogical, Natural Language and Knowledge Engineering Techniques in SOPHIE I, II and III, by J.S. Brown et al, *Intelligent Tutoring Systems*, edited by D. Sleeman and J.S. Brown, published by Academic Press (1982)[1]; and "Local Methods of Localizing Faults in Electronic Circuits," by J. de Kleer, published as M.I.T. Artificial Intelligence Laboratory Memo AIM-394 (1976)[2].].

Clark, "Negation as Failure", pp. 113-141 [also in *Logic and Data Bases*, eds. H. Gallaire and J. Minker, pp. 293-322, Plenum Press, NY, 1978; also in *Readings in Nonmonotonic Reasoning* ed. M.L. Ginsberg, Morgan Kaufman, Los Altos, CA, 1987).].

De Kleer et al., "Diagnosing Multiple Faults", this paper is a correction (as of Mar. 22, 1992, pp. 100-117) of one which first appeared in *Artificial Intelligence*, 32(1):97-130, Apr. 1987 [also in: *Readings in NonMonotonic Reasoning*, edited by Matthew L. Ginsbert, (Morgan Kaufman, 1987), 280-297].

De Kleer et al., "Diagnosis With Behavioral Modes", pp. 124-130 [This paper originally appeared in *Proc. IJCAI-89*, Detroit, MI (1989) 104-109; also in *Proc. 11th IJCAI*, pp. 1324-1330, Detroit, MI, 1989.].

De Kleer et al., "One Step Lookahead is Pretty Good", pp. 138-142 [Also in *Working Notes of the 2st Int. Workshop on Principles of Diagnosis*, ed. L. Console, pp. 136-142; Technical Report RT/DI/91—10-7, Dipartimento di Informatica, Universitá di Tornio, Tornio, Italy, Oct. 1991.].

De Kleer et al., "Characterizing Diagnoses and Systems", pp. 54-65 [originally appeared in *Artificial Intelligence*, 56(2-3):197-222, 1992].

De Kleer, "A Hybrid Truth Maintenance System", PARC technical Report, Jan. 1992, pp. 0-27.

Fromherz et al., "Model-Based Computing for Design and Control of Reconfigurable Systems", pp. 1-14, published in *AI Magazine, Special Issue on Qualitative Reasoning*, vol. 24, No. 4, 2003, pp. 120-130.

Contant et al., "Failure diagnosis of Discrete Event Systems: The Case of Intermittent Faults," in *Proceedings of the 41st IEEE Conference on Decision and Control*, pp. 4006-4011, 2002.

Koren et al., "Diagnosis of Intermittent Faults in Combinational Networks", *IEEE Trans. Computers*, 26(11):1154-1158, 1997.

Raiman, "A Circumscribed Diagnosis Engine", in *Proc. Int. Workshop on Expert Systems in Engineering*, eds. G. Gottlob and W. Nejdl, pp. 90-101; Springer Verlag LNCS 462, 1990.

De Kleer, "Getting the Probabilities Right for Measurement Selection", *American Association for Artificial Intelligence* (www.aaai.org) 2006, 5 pgs. also in *The 17th International Workshop on Principles of Diagnosis*, pp. 141-146, Burgos, Spain, 2006.

Brglez et al., "Accelerated ATPG and Fault Grading Via Testability Analysis", *Proceedings of ISCAS* 85, CH2114-7/85/0000-0695, 1985 IEEE, pp. 695-698.

European Search Report, EP Appl. No. EP07864789.8-2216 / 2153325 PCT/US2007085527; Mailed Apr. 15, 2011, Completed Apr. 8, 2011; Munich, DE.

\* cited by examiner

| i | A1 | A2 | O1 | X1 | X2 | obs | E |
|---|---|---|---|---|---|---|---|
| 2 | 0.345 | 0.310 | 0.345 | 0 | 0 | x=0 | 1.58 |
| 3 | 0.321 | 0.321 | 0.357 | 0 | 0 | y=0 | 1.58 |
| 4 | 0.332 | 0.299 | 0.369 | 0 | 0 | x=0 | 1.58 |
| 5 | 0.309 | 0.309 | 0.382 | 0 | 0 | y=0 | 1.58 |
| 6 | 0.319 | 0.287 | 0.394 | 0 | 0 | x=0 | 1.57 |
| 7 | 0.297 | 0.297 | 0.407 | 0 | 0 | y=0 | 1.57 |
| 8 | 0.306 | 0.275 | 0.419 | 0 | 0 | x=0 | 1.56 |
| 9 | 0.284 | 0.284 | 0.432 | 0 | 0 | y=0 | 1.55 |
| 10 | 0.292 | 0.263 | 0.445 | 0 | 0 | x=0 | 1.55 |
| 20 | 0.223 | 0.201 | 0.576 | 0 | 0 | x=0 | 1.41 |
| 40 | 0.107 | 0.097 | 0.796 | 0 | 0 | x=0 | 0.93 |
| 55 | 0.052 | 0.052 | 0.896 | 0 | 0 | y=0 | 0.59 |
| 56 | 0.052 | 0.047 | 0.901 | 0 | 0 | x=0 | 0.57 |
| 80 | 0.016 | 0.014 | 0.970 | 0 | 0 | x=0 | 0.23 |
| 90 | 0.010 | 0.009 | 0.982 | 0 | 0 | x=0 | 0.15 |
| 100 | 0.006 | 0.005 | 0.989 | 0 | 0 | x=0 | 0.10 |
| 120 | 0.002 | 0.002 | 0.996 | 0 | 0 | x=0 | 0.04 |
| 127 | 0.001 | 0.001 | 0.997 | 0 | 0 | y=0 | 0.03 |
| 128 | 0.001 | 0.001 | 0.998 | 0 | 0 | x=0 | 0.03 |

| FAULT | | INPUTS | | | SYMPTOM | |
|---|---|---|---|---|---|---|
| COMPONENT | OUTPUT | $a$ | $b$ | $c_i$ | $c_o$ | $q$ |
| A1 | 0 | 1 | 1 | 0 | 0 | X |
| A1 | 1 | 0 | 1 | 0 | 1 | X |
| A2 | 0 | 0 | 0 | 1 | 0 | X |
| A2 | 1 | 0 | 1 | 1 | 1 | X |
| O1 | 0 | 1 | 1 | 0 | 0 | X |
| O1 | 1 | 0 | 0 | 0 | 1 | X |
| X1 | 0 | 0 | 1 | 0 | X | 0 |
| X1 | 1 | 0 | 0 | 0 | X | 1 |
| X2 | 0 | 0 | 1 | 0 | X | 0 |
| X2 | 1 | 1 | 1 | 0 | X | 1 |

| i | A1 | A2 | O1 | X1 | X2 | obs | E |
|---|------|------|------|---|---|-------|------|
| 2 | 0.40 | 0.20 | 0.40 | 0 | 0 | x = 0 | 1.52 |
| 3 | 0.25 | 0.25 | 0.50 | 0 | 0 | y = 0 | 1.50 |
| 4 | 0.27 | 0.18 | 0.55 | 0 | 0 | x = 0 | 1.44 |
| 5 | 0.20 | 0.20 | 0.60 | 0 | 0 | y = 0 | 1.37 |
| 6 | 0.21 | 0.16 | 0.63 | 0 | 0 | x = 0 | 1.31 |
| 7 | 0.17 | 0.17 | 0.67 | 0 | 0 | y = 0 | 1.25 |
| 8 | 0.17 | 0.14 | 0.69 | 0 | 0 | x = 0 | 1.20 |
| 9 | 0.14 | 0.14 | 0.71 | 0 | 0 | y = 0 | 1.15 |
| 10 | 0.15 | 0.12 | 0.73 | 0 | 0 | x = 0 | 1.11 |
| 11 | 1.00 | 0 | 0 | 0 | 0 | y = 1 | 0 |

110

| CIRCUIT | COMPONENTS | NONI-COST | i COST | ERROR |
|---------|------------|-----------|--------|-------|
| c17     | 6          | 2.7       | 29     | .07   |
| c432    | 160        | 5.5       | 94     | .08   |
| c499    | 201        | 5.3       | 94     | .09   |
| c880    | 384        | 5.2       | 79     | .09   |
| c1355   | 546        | 6.9       | 126    | 1.04  |

FIG. 11

DIAGNOSING INTERMITTENT FAULTS

This application claims priority to U.S. Provisional Application No. 60/931,524, filed May 24, 2007, entitled "Diagnosing Intermittent Faults" by Johan de Kleer; and U.S. Provisional Application No. 60/931,526, filed May 24, 2007, entitled "Troubleshooting Temporal Behavior in 'Combinational' Circuits" by Johan de Kleer, the disclosures of which are hereby incorporated by reference in their entireties.

BACKGROUND

Model-based diagnosis (MBD) involves model-based testing in which test cases are derived in whole or in part from a model that describes some, usually functional, aspects of the system under test. The model is usually an abstract, partial representation of the system under test-desired behavior. The test cases derived from this model are functional tests on the same level of abstraction as the model.

Model-based diagnosis is diagnostic and system-directed. Particularly, it starts with the observed misbehavior and works back toward the underlying components that may be broken.

Model-based diagnosis may be employed in a variety of arenas, including detecting faulty system behavior, identifying faulty components, repairing of the system, and reconfiguring of the system. Other areas to which MBD may be applied, include debugging cognitive models, designing experiments to build improved models of gene pathways, troubleshooting power grids, troubleshooting manufacturing lines, identifying faults in spacecraft, airplanes, and debugging programs, among other uses.

However, an issue related to the diagnosis of systems using MBD as well as other testing approaches, such as "ad hoc" hand-coded rules, machine learning of patterns, D-algorithm searching, and analytical redundancy relationships, among others, is the inability to accurately diagnose intermittent faults.

Experience with diagnosis of automotive systems and reprographic machines shows that intermittent faults are among the most challenging kinds of faults to isolate. Such systems raise many modeling complexities. The approach to isolating these intermittent faults is presented in the context of logic systems. However, it is to be appreciated the present concepts may be employed in many other environments.

Presently, the main approach used to attempt to find intermittent faults is to stress the system under test, in an attempt to convert the intermittent faults to persistent failures, and then diagnose those failures. However, these approaches tend to lead to increased system failures of the overall system.

Therefore, it is desirable to employ a system and method which finds or isolates intermittent faults but does not stress the system under test, and thereby avoid increased system failures.

INCORPORATION BY REFERENCE

U.S. application Ser. No. 11/942,234, filed Nov. 19, 2007, entitled "TROUBLESHOOTING TEMPORAL BEHAVIOR IN 'COMBINATIONAL' CIRCUITS", by Johan de Kleer; and U.S. application Ser. No. 11/925,444, filed Oct. 30, 2007, entitled "DYNAMIC DOMAIN ABSTRACTION THROUGH META-ANALYSIS", by Johan de Kleer.

BRIEF DESCRIPTION

A method and system for diagnosing any combination of persistent and intermittent faults. The behavior of a system under test is obtained by measuring or probing the system at a particular location(s). The predicted behavior of a modeled system corresponding to the system under test is investigated by drawing inferences based on at least conditional probabilities, prior observations and component models. The predictions are compared to their corresponding points in the system under test. A determination is made if a conflict exists between the measured behavior and the predicted behavior, and the posterior probabilities are adjusted to more and more accurately reflect the action fault(s) in the system under test. The conflicts or deviations between the obtained predicted behavior and the actual behavior are used to obtain a final result such as isolating the component(s) of the system causing the faults.

BRIEF DESCRIPTION OF THE DRAWINGS

FIG. 4 is a table illustrating probabilities of component failure over time, where row 0 are the prior probabilities of the components intermittently failing, row 1 are the probabilities conditioned on knowing the system has a fault, and row 2 are the probabilities conditioned on $c_o=1$ and so on;

FIG. 11 shows the average diagnostic cost of the present concepts when used in connection with well known benchmark circuits ISCAS-85;

DETAILED DESCRIPTION

Figure 1:
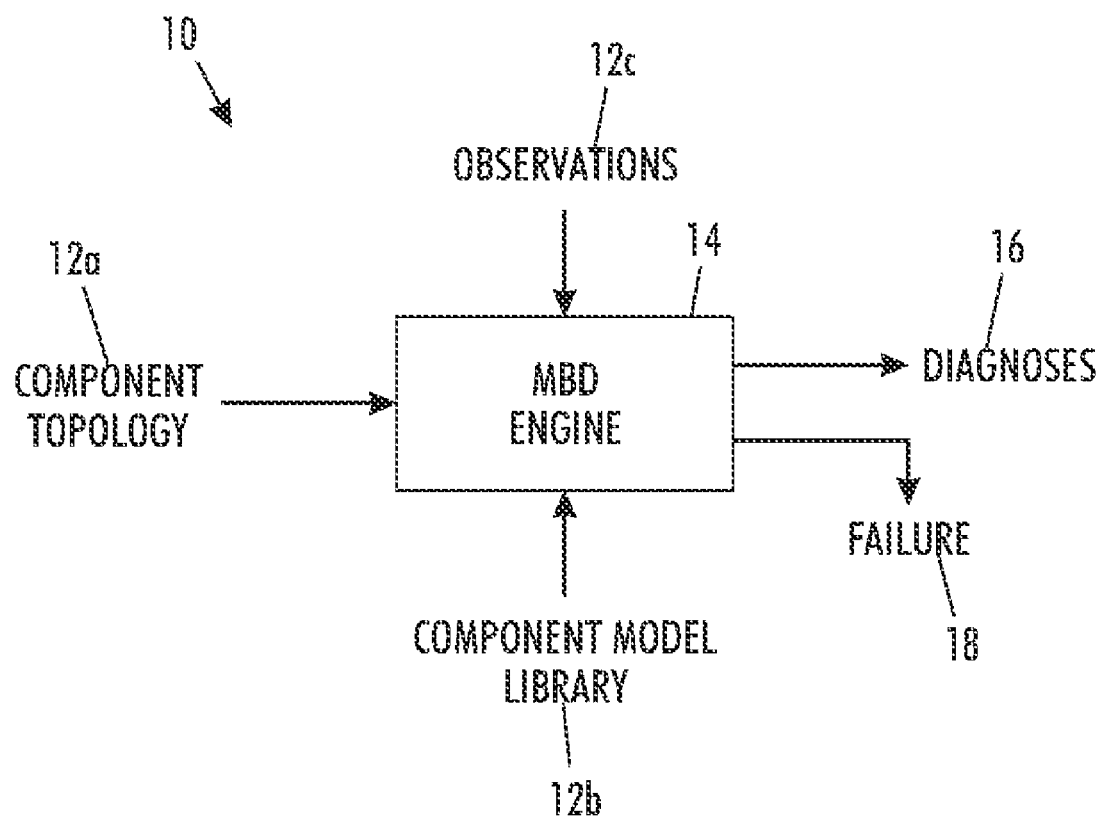
FIG. 1 illustrates the main inputs and outputs of a model-based diagnosis engine.

FIG. 1 characterizes the main inputs and outputs of a model-based, component-based diagnosis (MBD) engine architecture 10. Given the component topology (e.g., the schematic for analog circuits) 12a, component models (e.g., resistors obey ohm's law) 12b and observations (e.g., the voltage across resistor R6 is 4 volts) 12c, model-based diagnosis (MBD) engine 14 computes diagnoses 16 which explain all the observations 12c. Observations inconsistent with expectations guide the discovery of diagnoses. When the model-based diagnosis (MBD) engine can find no diagnoses it signals a failure 18.

Existing model-based diagnosis (MBD) approaches presume the system being diagnosed behaves non-intermittently MBD system therefore and analyze the system's under-test behavior over a small number (often one) of time instants. The following discussion shows how existing approaches to model-based diagnosis can be extended to diagnose intermittent failures as they manifest themselves over numbers of time instants. In addition, the following discloses where to insert probe points to best distinguish among the intermittent faults that best explain the symptoms created by the fault and isolate the fault in minimum expected cost.

The notion of intermittency is a hard-to-define concept, so it is first described here intuitively before being defined more formally. A system consists of a set of components. A faulty component is one which is physically degraded such that it will not always function correctly. For example, a faulted resistor may no longer conduct the expected current when a specified voltage is applied across it. A worn roller in a printer may no longer grip the paper consistently thereby causing intermittent paper jams. In the case of a worn roller, it usually operates correctly but will infrequently slip and cause a paper jam. Therefore the present concept associates two probabilities with each potentially intermittent component (1) the probability the actual component deviates from its design such that it may exhibit a malfunction, and (2) the conditional probability the faulted component malfunctions when observed. For example, the probability of a roller being worn might be $10^{-5}$ while the probability of a worn roller actually malfunctioning might be 0.01. In this document we show how to troubleshoot devices containing any combination of intermittent or persistent faults. The device may contain any number of faults. The approach both computes the posterior probabilities after observations are made as well as additional probes needed to further isolate the fault(s) in the device.

The dynamic behavior of a system is not modeled over the time. Instead, the system is viewed in a sequence of observation events. For example, a piece of paper is fed into a printer, it may be observed to jam. A test-vector is applied to a combinational digital circuit and its output signals subsequently observed.

Definition 1 An intermittently faulted component is one whose output(s) are not a function of its inputs.

Intermittency can arise from at least two sources. If the system can be modeled at a more detailed (i.e., abstraction) level, apparent intermittency can disappear. For example, two wires may be shorted, making it look like a gate is intermittent, when in fact there is an unmodeled and unwanted bridge connection. The second type of intermittency arises from some stochastic physical process which is intermittent at any level of detail. This discussion focuses on this second type of intermittency.

1 Overview of Flow Process and System for Diagnosing Intermittent Faults

Turning now more particularly to the concepts of the present application, it is known that intermittent faults in complex systems are very hard to pinpoint, in part because faults and symptoms can appear and disappear without any observable pattern. Such faults are notoriously difficult for technicians to isolate, and therefore pose a problem for almost all approaches to diagnosis. The present concepts propose an approach that is grounded in model-based diagnosis (MBD), which works from a model of a system (e.g., circuit schematic and behavior models of behavior models of components), and utilizes deviations of actual behavior from the model's behavior to isolate the faulty component(s). At each stage, recalculated conditional probabilities associated with possible fault causes, guide the next stage of observation and measurement.

Thus, the present concepts focus on diagnosing intermittent faults by adjusting component probabilities so that they continue to accept the possibility a subsequent measurement will produce a different value, thus avoiding irreconcilable inconsistencies.

Figure 2:
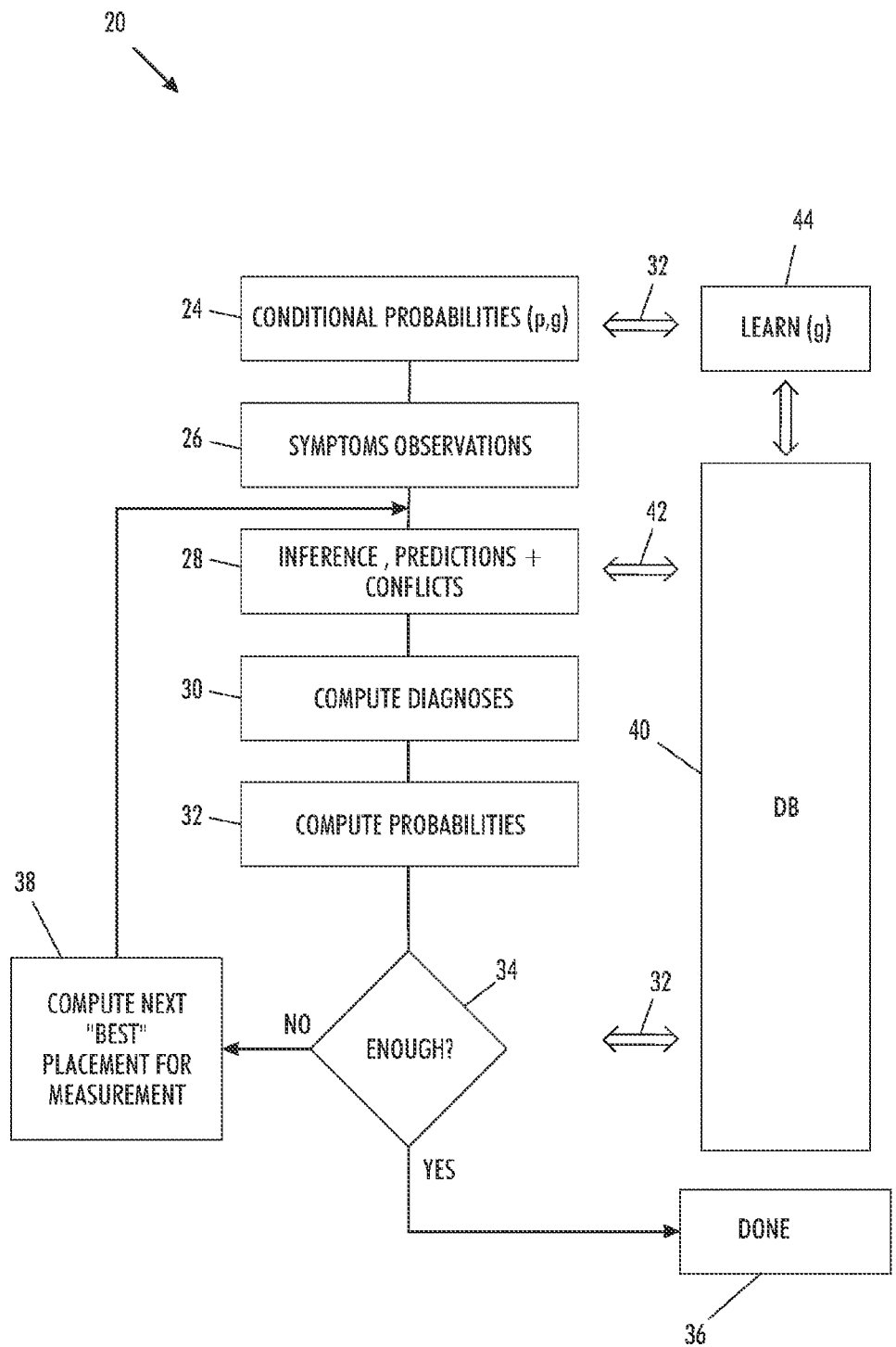
FIG. 2 illustrates a diagram directed to the concepts of a system and method which efficiently diagnoses intermittent faults in simple and complex systems.

Turning to FIG. 2, presented is an overview diagram directed to the concepts of a system and method which efficiently diagnoses intermittent faults in simple and complex systems. In the model-based diagnosis flow diagram 20 of FIG. 2, components are provided with conditional probabilities 24. Each component of the system or device under test has associated with it two probabilities, (1) the probability the actual component deviates from its design such that it may exhibit a malfunction, and (2) (if potentially intermittent) the conditional probability the failed component malfunctions when observed. In step 26, observations of the "real world" system having potential faults, and the corresponding model of that system are observed. These "real world" observations may in one instance be obtained by probing the circuit via a probing device such as known in the art (e.g., a volt meter, current tester, logic analyzer, high-speed camera).

Next, with regard to the MBD model, knowing certain inputs, predictions of the model are made using inferences as done in conventional MBD analysis. As part of this process, observations that differ from the prediction yield conflicts, step 28. These conflicts are used in step 30 to compute a diagnosis. As shown in step 32, the computed diagnoses 30, which identifies deviations of actual behavior from the model's behavior, is then used to isolate the faulty component(s). Thus, in step 32, the posterior probabilities associated with the components of the model are adjusted so they may continue to accept the possibility that a subsequent measurement may produce a different or more acceptable value, thus avoiding irreconcilable inconsistencies.

More particularly, in step 34, an inquiry is made as to whether sufficient observations (i.e., measurements and/or probing) have taken place. This "ENOUGH?" inquiry may be directed to something as simple as the number of probing or measurement operations which have taken place, or it may be inquiring if a probability threshold value has been reached so the most probable diagnosis can be accepted as a true diagnosis. For example, if it is inferred that a resistor (e.g., R4) is 0.90 likely to be the faulty component of a system, and if the inquiry in step 34 has a threshold value that anything over a likelihood of 0.80 is sufficient to be acceptable as a final diagnosis, then in this case, the process would move to step 36, and a final diagnosis would be reached.

On the other hand, if step 34 does not reach the number of measurements or probes that are determined to be the maximum, or the probability factor is not greater than a determined threshold, the process moves to step 38, where a next (in the case of intermittents, this may repeat the same probe at a next sample) placement of the measurement or probing location is determined. In one example, this would simply mean moving a probing device (e.g., from the input of a device A to the output of a device B). Once the new measurement or probing location is determined in step 38, and the actual measurements have been obtained, the process moves back to the input of step 28, and the process is repeated.

Also shown in FIG. 2 is a database 40. It is to be appreciated the system shown in flow diagram 20 may be implemented in a computing device, either particularly built for MBD operations to diagnose intermittent faults, or any other general computing device. Such devices will have storage elements such as defined by database 40. As can be seen by arrow 42, the intent is to emphasize that the information used and generated by the various modules or steps in flow diagram 20 can be stored at memory locations within database 40.

In the same regard, block 44 is a learning block particularly related to learning and providing accurate values for one of the associated conditional probabilities of step 44, and in particular the conditional probability g(c) that a component is behaving correctly when it is faulted. While such information in one embodiment may be generally obtained from the manufacture or previous experience with that component in similar systems, such information can vary widely. Therefore module or step 44 can update this conditional probability information.

As can be seen from the drawings, the concepts of step 32, by computing or recalculating the probabilities is expanded upon in Sections 2.2, 3.0 and 10.0 of the following discussion.

The concepts of computing a "best" placement for a next measurement is discussed in Sections 4.0 and 8.0, of the following discussion. Further, details on learning the second associated probability is expanded upon in section 5.0 of the following discussion.

2 GDE Probability Framework

The GDE framework includes having the behavior of components expressed as constraints, predicate calculus, or as conventional rules. GDE can use an Assumption-Based Truth Maintenance System (ATMS) to record all the conclusions it draws from these models and the observations.

GDE computes a probability for each candidate diagnosis. Given component failure probabilities and assuming components fail independently, GDE assigns a prior probability to each diagnosis. As observations accumulate the (posterior) probabilities of diagnoses shift according to Bayes' rule. Candidate diagnoses which are logically eliminative by the evidence receive probability 0. Although GDE uses the consistency-based definition of diagnosis (as opposed to the abductive definition), applying Bayes' rule drives up the posterior probabilities of those diagnoses that entail the observation compared with those that are just consistent with it. As a consequence, its use of Bayes' rule to update posterior probabilities results in GDE exhibiting a synthesis of the properties of consistency-based diagnosis and of abduction-based diagnosis.

To determine what is actually wrong with a system usually requires obtaining additional measurements. In one embodiment, GDE performs sequential diagnosis by choosing the best measurement to make next. It commonly uses a one-step look-ahead function based on minimum entropy (e.g., a myopic minimum entropy strategy). Multistep lookahead will choose better measurements but is typically computationally impractical. GDE proposes a set of measurements to make which will, on average, require a minimum number of measurements to localize the correct diagnosis.

An Assumption-based Truth Maintenance System (ATMS) and Hybrid-Truth Maintenance System (HTMS) framework involves, a propositional inference engine designed to simplify the construction of problem solvers that search complex search spaces efficiently. The ATMS represents problem states with assumptions, which correspond to primary binary choices, and nodes, which correspond to propositions whose truth is dependent on the truth of the assumptions. Dependency relationships among assumptions and nodes are determined by a domain-specific problem solver such as a conventional inference engine. The problem solver presents these relationships to the ATMS as clauses justifications. The ATMS determines which combinations of assumptions are consistent and identifies the conclusions to which they lead.

The ATMS is conventionally utilized by combining it with a conventional inference engine appropriate to the problem being solved. The extension includes a propositional reasoner and an interface that receives calls from the inference engine, passes them to the propositional reasoner, and returns results to the inference engine.

Definition 2 A system is a triple (SD, COMPS, OBS) where:

1. SD, the system description, is a set of first-order sentences.
2. COMPS, the system components, is a finite set of constants.
3. OBS, a set of observations, is a set of first-order sentences.

Definition 3 Given two sets of components Cp and Cn define D(Cp,Cn) to be the conjunction:

$$\left[\bigwedge_{c \in C_p} AB(c)\right] \wedge \left[\bigwedge_{c \in C_n} \neg AB(c)\right].$$

Where AB(x) represents that the component x is ABnormal (faulted).

A diagnosis is a sentence describing one possible state of the system, where this state is an assignment of the status normal or abnormal to each system component.

Definition 4 Let $\Delta \subseteq$ COMPS. A diagnosis for (SD, COMPS, OBS) is $D(\Delta,\overline{\text{COMPS}}-\Delta)$ such that the following is satisfiable:

$$SD \cup OBS \cup \{d(\Delta, COMPS-\Delta)\}$$

Definition 5 An AB-literal is AB(c) or $\neg$AB(c) for some c$\in$COMPS.

Definition 6 An AB-clause is a disjunction of AB-literals containing no complementary pair of AB-literals.

Definition 7 A conflict of (SC, COMPS, OBS) is an AB-clause entailed by SD$\cup$OBS.

For most of this document we assume 'weak' fault models; or the ignorance of abnormal behavior assumption: No fault models are presumed. Section 10, Extension to multiple persistent or intermittent faults, shows how this assumption can be relaxed.

2.1 Representing Time

Time is expressed easily in the preceding formalism. For example, the model of an inverter is often written as:

$$\text{INVERTER}(x) \to [\neg AB(x) \to [\text{in}(x, t) = 0 \equiv \text{out}(x, t) = 1]].$$

When ambiguous this document represents the value v of variable x at time t as T(x=v,t). Time is a sequence of instants $t_0, t_1, \ldots$. The probability of X at time t is represented as $p_t(X)$.

2.2 Updating Diagnosis Probabilities

Components are assumed to fail independently. Therefore, the prior probability a particular diagnosis D(Cp,Cn) is correct is:

$$p_1(D) = \prod_{c \in C_p} p(c) \prod_{c \in C_n} (1 - p(c)), \quad (1)$$

where p(c) is the prior probability that component c is faulted.

The posterior probability of a diagnosis D after an observation that x has value v at time t is given by Bayes' rule:

$$p_t(D \mid x = v) = \frac{p_t(x = v \mid D)p_{t-1}(D)}{p_t(x = v)}. \quad (2)$$

$P_{t-1}(D)$ is determined by the preceding measurements or prior probabilities of failure. The denominator $P_t(x=v)$ is a normalizing term that is identical for all p(D) and thus needs not be computed directly. The only term remaining to be evaluated in the equation is $p_t(x=v|D)$:

$p_t(x=v|D)=0$ if $D, SD, OBS, T(x=v,t)$ are inconsistent, else, $p_t(x=v|D)=1$ if $T(x=v,t)$ follows from $D, SD, OBS$ If neither holds, $$p_t(x_i=v_k|D)=\epsilon_{ik} \quad (3)$$

Various $\epsilon$-policies, which are known in the art, are possible and a different $\epsilon$ can be chosen for each variable $x_i$ and value $v_k$. Typically, $$\epsilon_{ik} = \frac{1}{m}.$$

This corresponds to the intuition that if x ranges over m possible values, then each possible value is equally likely. In digital circuits m=2 and thus $\epsilon$=0.5.

In the conventional framework, observations that differ with predictions yield conflicts, which are then used to compute diagnoses. Consider the full adder digital circuit 50 of FIG. 3, which computes the binary sum of $c_i$ (carry in), a and b; q is the least significant bit of the result and $c_o$ (carry out) the high order bit. Suppose all the inputs ($c_i$, a, b) to the circuit are 0, and $c_o$ is measured to be 1. This yields one minimal conflict:

AB(A1)VAB(A2)VAB(O1).

For brevity sake we shall write all diagnoses with [f] where f are the faulted components. The single fault diagnoses are thus: [A1] [A2] [O2]

3 Extensions to the Conventional Framework to Support Intermittent Faults

In the conventional framework, p(c) is the prior probability that component c is faulted. In the new framework, two probabilities are associated with each component: (1) p(c) represents the prior probability that a component is intermittently faulted, and (2) (for potentially intermittent components) g(c) represents the conditional probability that component c is behaving correctly when it is faulted.

In the intermittent case, the same sequential diagnosis model and Bayes' rule update applies. However, a more sophisticated $\epsilon$-policy is needed. Note that an $\epsilon$-policy applies only when a particular diagnosis neither predicts $x_i=v_k$ nor is inconsistent with it. Consider the case where there is only a single fault. As we assume all inputs are given, the only reason that a diagnosis could not predict a value for $x_i$ is when the faulted component causally affects $x_i$. Consider the single fault diagnosis $\{c\}$. If c is faulted, then g(c) is the probability that it is producing a correct output. There are only two possible cases: (1) c is outputting a correct value with probability g(c), (2)c is producing a faulty value with probability 1−g(c). Therefore, if $x_i=v_k$ follows from D({ },COMPS), SD;OBS and ignoring conflicts:

$p_t(x_i=v_k|[c])=g(c)$.

Otherwise,
$p_t(x_i=v_k|[c])=1-g(c)$. These two $\epsilon$ equations are equivalent to (no need to ignore conflicts):

$$p_t(x_i = v_k \mid [c])) = g(c) \text{ if } D, o(c), OBS,$$
$$SD \vdash T(x_i = v_k, t) + 1 - g(c) \text{ if } D, \bar{o}(c), OBS, SD \vdash T(x_i = v_k, t)$$

Here, $\bar{o}(c)$ is the correct model for component c, and B(c) the incorrect (output negated) model.

Figure 3:
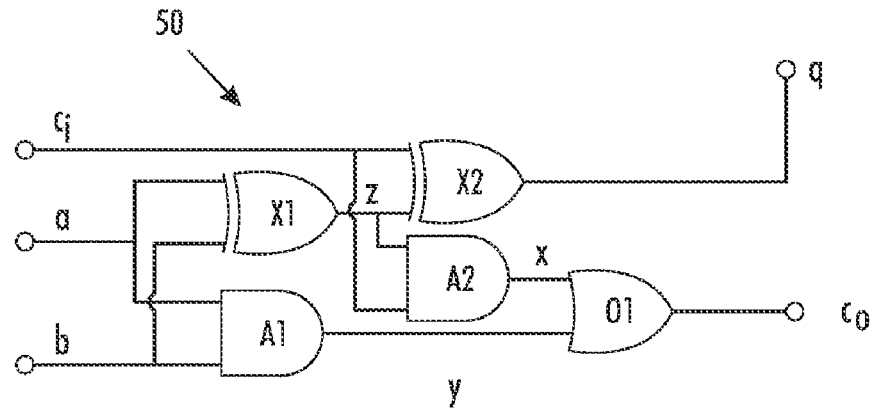
FIG. 3 illustrates a full adder, and this circuit computes the binary sum of $c_i$ (carry in), a and b; q is the least significant bit of the result and $c_o$ (carry out) the high order bit.

For example, observing $c_o=1$ in FIG. 3 results in three single faults: [O1], [A1], [A2]. If all components are equally likely to fail a priori, then p([A1]), p([A2]), $$p([O1]) = \frac{1}{3}.$$

Figure 4:

Suppose it is next observed, y=0. In the conventional framework this has no consequence, as the observation is the same as the prediction. However, in the intermittent case, such 'good' observations provide significant diagnostic information. Table 60 of FIG. 4 illustrates the results if $c_o$ is first observed to be faulty, g(c)=0.9 for all components, O1 is the actual fault, and y is observed continuously. In Table 60, row 0 are the prior probabilities of the components intermittently failing, row 1 are the probabilities conditioned on knowing the system has a fault, and row 2 are the probabilities conditioned on $c_o=1$ and so on. As sampling continues, p([A1]) will continue to drop (i.e., as more time instants of measurement in rows 0-12 are made). An intelligent probing strategy might switch to observing x at time (row)) 4. As y is insensitive to any error at [O1], no erroneous value would ever be observed.

Figure 5:
FIG. 5 is a Table showing the probes required to isolate a failing O1.

Failing components closer to the input are easier to isolate as there are fewer confounding effects of intermediate components through which the signals must propagate before reaching a suspect component. Table 62 of FIG. 5 presents a sequence of probes (i) to isolate a fault in O1. Although O1 can never be identified as failing with probability 1, the table shows that repeated observations drive O1's probability asymptotically to 1 (e.g., 0.998).

It is important to note that the single fault assumption does not require an additional inference rule. The Bayes' rule update equation does all the necessary work. For example, when $c_o=1$ is observed, the single fault diagnoses [X1] and [X2] both predict $c_o=0$ and thus are both eliminated from consideration by the update equation. As an implementation detail, single faults can be computed efficiently as the intersection of all conflicts found in all the samples.

4 a Simplistic Probing Strategy for Single Faults

Consider again the example of FIG. 3 and Table 60 of FIG. 4. Repeatedly measuring y=0 will monotonically drive down the posterior probability of A1 being faulted. Choosing probes which drive down the posterior probability of component faults is at the heart of effective isolation of intermittent faults.

Figure 6:
FIG. 6 is a Table illustrating a set of diagnostic situations to evaluate diagnostic cost (DC) for the full adder of FIG. 3, where X represents irrelevant.

A probing strategy better for isolating some faults, might perform worse on others. To fairly compare proposed strategies by their expected diagnostic cost:

$$DC(D, A) = \sum_{s \in S} p(s)c(D, s, A),$$

where S is the set of diagnostic situations, p(s) is the probability of a particular diagnostic situation, D is the device, A is the algorithm used to select probes, and c(D, s, A) is the cost of diagnosing device D in diagnostic context s with algorithm A. In limited cases, DC can be exactly calculated. Generally DC must be estimated by, for example, with S consisting of pairs (f,v) where f is the fault and v is a set of device input-output pairs which cause D to manifest the symptom. For example, the situation illustrated in the previous section corresponds to Table 64 of FIG. 6 where f="O1 output 1" and v=($c_i$=0, a=0, b=0, $c_o$=1). Table 64 of FIG. 6 is a set of situations which can be used to evaluate expected diagnostic cost for the circuit of FIG. 3. Each line lists the faulty component, its faulty output, an input vector, and an output observation which is sensitive to the fault (i.e., if the component produces the correct value, it would change this output value).

Table 60 of FIG. 4, therefore, suggests a very simple probing strategy from which we can compute an upper bound on optimal diagnostic cost (DC). The simplest strategy is to pick the lowest posterior probability component and repeatedly measure its output until either a fault is observed or its posterior probability drops below some desired threshold.

The number of samples needed depends on the acceptable misdiagnosis threshold e. Diagnosis stops when one diagnosis has been found with posterior probability p>1−e. To compute the upper bound we: (1) take no advantage of the internal structure of the circuit; (2) presume that every measurement can exonerate only one component; (3) are maximally unlucky and never witness another incorrect output.

Let n be the number of components $c_i$, $p_1([c_i])$ derived from the priors, and $o_i$ the number of samples of the output of $c_i$. To shorten the mathematics Bayes' rule is written as:

$$p_t([c_i]) = \alpha p_t(x=v|[c_i])p_{t-1}([c_i]),$$

where, $\alpha$ is chosen such that the posterior probabilities sum to 1. Notice that $p_t(x=v|[c_i])=g(c_i)$ when the output of component $c_i$ is observed. After t samples:

$$p_t([c_i]) = \alpha g(c_i)^{o_i} p_1([c_i]),$$

where, $$\sum_i o_i = t,$$

and, $$\alpha = \frac{1}{\sum_i g(c_i)^{o_i} p_1([c_i])}.$$

Splitting the misdiagnosis threshold evenly across all components, $o_i$ is picked such that:

$$\alpha g(c_i)^{o_i} p_1(c_i) < \frac{e}{n}.$$

It is then necessary to solve for $o_i$ in:

$$\frac{g(c_i)^{o_i} p_1([c_i])}{\alpha} = \frac{e}{n}.$$

If $o_i$ is sufficiently large, then $\alpha=1-p([c_i])$ so it is possible to solve for $o_i$ in:

$$\frac{g(c_i)^{o_i} p_1([c_i])}{1 - p_1([c_i])} = \frac{e}{n},$$

$$o_i = \frac{\log e - \log n - \log p_1([c_i]) + \log(1 - p_1([c_i]))}{\log g(c_i)}.$$

In the case of the full adder example all priors are equal, g=0.9, and e=0.1. So based on the preceding equation, $o_i$=28.1. Hence, a worst case strategy is to measure each point 29 times. However, the last probe need not be made since the strategy would have failed to identify a fault earlier, and hence because the device has a fault, the final probe point is at the fault. There is no need to measure the non-symptom output because that cannot provide information on any single fault. Therefore, the upper bound is 58. This worst case is corroborated in Table 62 of FIG. 5 where it takes 56 probes to isolate O1 (e.g., above 0.900). Faults in A1 and A2 would be detected with far fewer probes.

Rarely can we compute a bound on a particular diagnostic algorithm so neatly. In most cases the diagnostic cost (DC) of a particular algorithm can only be evaluated empirically. Applying the previous DC algorithm on the vectors of Table 64 of FIG. 6, and assuming all faults are equally likely, g=0.9, e=0.1, results in an expected cost of DC=22.2 with observed error of 0.05. This DC is far smaller than the 58 bound calculated earlier, because faults in A1 and A2 evaluated in far fewer probes and DC is an average. As the manifestation of intermittent faults is inherently random, there will always be a chance of misdiagnosis. The observed error of 0.05 is better than our desired 0.1. In general, the observed error will be close to the theoretical error, but it will vary because of specific characteristics of the circuit being analyzed and the sequence of random numbers generated in the simulation.

5 Learning g(c)

Although the prior probability of component failure can be estimated by the manufacturer or previous experience with that component in similar systems, g(c) typically varies widely. Therefore, it is useful to learn the g(c) over the diagnostic session instead of initially presuming it has some specific value.

Estimating g(c) requires significant additional machinery which is only described in the single fault case. An estimate of g(c) is made by counting the number of samples c is observed to be functioning correctly or incorrectly. Then G(c) is defined to be the number of times c could have been working correctly, and B(c) as the number of times c has been observed working incorrectly. Corroboratory measurements which c cannot influence are ignored (conflicting measurements exonerate any component which cannot influence it, in which case g(c) is no longer relevant). The g(c) is estimated as (if either G(c) or B(c) is 0, g(c)=0.5):

$$g(c) = \frac{G(c)}{G(c) + B(c)}.$$

The situations in which c is working incorrectly are straightforward to detect—they are simply the situations in which the Bayes' update equation utilizes $p_t(x_i=v_k/[d])=1-g(c)$. The cases in which c is working correctly requires additional inferential machinery. Consider again the example of circuit 50 of FIG. 3, where all the inputs are 0, and the expected $c_o=0$ is observed. Or-gate O1 cannot be behaving improperly because its inputs are both 0, and its observed output is 0. And-gate A1 cannot be behaving improperly because its inputs are both 0, and its output must be 0, as O1 is behaving correctly and its output was observed to be 0. Analogously, And-gate A2 cannot be faulted. However, there is no evidence as to whether X1 is behaving improperly or not, because if X1 were behaving improperly, its output would be 1, but that cannot affect the observation because And-gate A2's other input is 0. X2 cannot causally affect $c_o$. To summarize, if it is observed $c_o=0$ at an instant in which all the inputs are 0, it has been learned that A1, A2 and O1 cannot be misbehaving alone, and nothing is learned about the faultedness of X1 and X2. Hence, G(A1), G(A2) and G(O1) are incremented. All other counters are left unchanged. In summary, as a consequence of observing $c_o=0$, the G(A1), G(A2), and G(O1) are incremented. The net consequence will be that the diagnostician may have to take (slightly) more samples to eliminate A1, A2 or O1 as faulted.

Figures 7, 8:
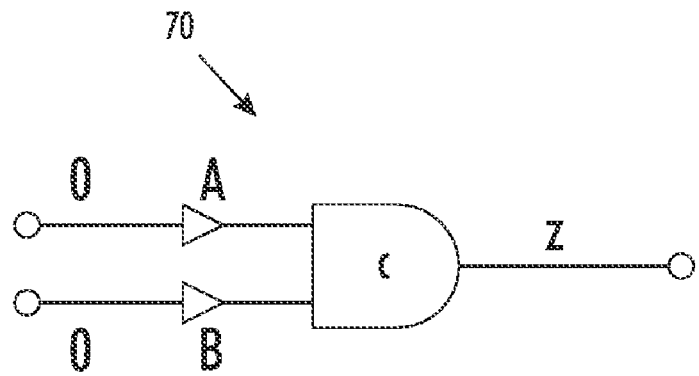
FIG. 7 is an exemplary And-gate circuit.
FIG. 8 is a Table showing the result of probing strategy using learning, with A1 failing at i=11 and the final column being the entropy of the distribution, a measure of how closely the correct diagnosis has been isolated.

Consider now the example circuit 70 of FIG. 7. At t=0, the inputs are both 0, and the output is observed to be z=0. Neither the single fault A nor B can influence z=0, therefore the counters for A and B are left unchanged. However, C can influence the output and therefore G(C) is incremented. More formally, in response to an observation $x_i=v_k$, G(c) is incremented if a different value for $x_i$ logically follows from the negated model $\bar{o}(c)$; c causally influences the observation and G(C) is incremented.

Table 80 of FIG. 8 shows the results of a probing strategy (for circuit 50 of FIG. 3), with A1 failing at g=0.9. The final column (E) is the entropy of the distribution, a measure of how closely the correct diagnosis has been isolated. Table 80 shows the sequence of probes used to isolate a fault in A1. A1's fault is manifest at i=11. Notice that the conditional probabilities shift differently as compared to the non-learning case Table 60 of FIG. 4. As g(c)=0.5 is assumed without any evidence, measuring x=0 immediately drops A2's probability to 0.5 compared to the other two diagnoses. When using learning, initial g(c)'s need to be chosen with some care as they significantly influence diagnosis.

6 Hybrid Truth Maintenance System (HTMS) Implementation Considerations

The approach has been fully implemented on GDE/HTMS architecture. Section 9 reports the performance of the approach on various benchmarks.

Recall the Bayes' rule update equation requires two repeated checks:

$$D, o(c), OBS, SD \vdash T(x_i = v_k, t),$$

$$D, \bar{o}(c), OBS, SD \vdash T(x_i = v_k, t).$$

In the GDE approach each conflict is represented by a positive clause of ATMS assumptions corresponding to the AB-literals. Unfortunately, this representation of conflicts makes it difficult to evaluate these two checks through efficient ATMS operations. The full adder example illustrates the problem very simply (all inputs 0, $c_o=1$ observed once). If the conflict, $$AB(A1) \vee AB(A2) \vee AB(O1),$$

were represented directly as an ATMS clause, then no value for $c_o$ could be inferred at any later samples. If the g(c)'s were different for the three gates it can be useful to measure $c_o$. In this implementation, every GDE conflict is represented as an ATMS clause which includes the time instant(s) at which it was noticed. Thus the conflict for FIG. 3 is represented:

$$(t \neq 2) \vee AB(A1) \vee AB(A2) \vee AB(O1).$$

The Bayes' rule update checks are performed within the ATMS which respects the time assumptions. For the purpose of generating candidates these time assumptions are invisible to GDE. The Bayes' rule checks are performed within the ATMS which respects the time assumptions. In this way, the same efficient GDE/Sherlock mechanisms can be exploited for diagnosing intermittent faults. Hence, the ATMS representation of a conflict specifies that at least one of its AB-literals indicates a component which is producing a faulty output at time instant i. Likewise every inference includes a time assumption. GDE represents prime implicates of the form:

$$(t \neq i) \vee AB(c_1) \vee \ldots \vee AB(c_n) \vee x = v,$$

as:

$$\langle x=v, \{\{(t=i), \neg AB(c_1), \ldots, \neg AB(c_n)\}\} \rangle.$$

The update tests required by both Bayes' rule update and the checks to decide whether G(c) should be incremented can often be significantly sped up. Consider the case where there is only one prime implicate of this form (except for the time assumption) for x=v. Given that there is no smaller set of NAB's which support x=v; and that an AB component necessarily behaves incorrectly under its 1−g case, it must be the situation that if x=v then any AB changed from negative to positive will result in x≠v. In our example, there is exactly one prime implicate which supports $c_o=0$:

$$(t=0) \vee AB(A1) \vee AB(A2) \vee AB(O1) \vee c_o=0.$$

Therefore, the single faults [O1], [A1] and [A2] cannot explain the observation. When there is more than one such prime implicate, we must intersect all the antecedent AB sets. This is similar to a Clark-completion inference. Consider again the example circuit 70 of FIG. 5 where z=0 is observed. GDE finds two prime implicates which support z=0 (written here as implications):

$$(t=0) \wedge \neg AB(A) \wedge \neg AB(C) \rightarrow z=0$$

$$(t=0) \wedge \neg AB(B) \wedge \neg AB(C) \rightarrow z=0$$

Under the single fault assumption, the intersection of antecedents of the implications must be behaving correctly. Therefore, G(C) is incremented.

7 Exploring Diagnostic Cost

Figure 9:
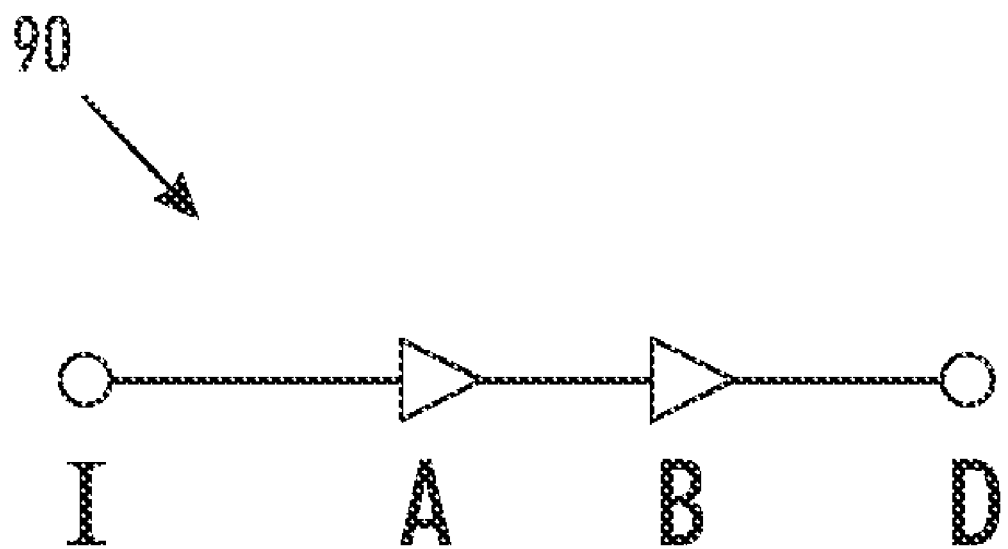
FIG. 9 is an exemplary two-buffer circuit.

Consider the very simple two buffer circuit sequence 90 of FIG. 9. Assume A and B are equally likely to fault and g=0.9: As it is assumed the input is given, and that a faulty observation was observed, there is only one measurement point, the output of A, that can provide any useful information.

In this simple case there is no choice of measurement point. First, consider the case where B is intermittent. The output of A will always be correct. Following the same line of development as Section 4 A simplistic probing strategy for single faults, after n measurements:

$$p_{n+1}([A]) = \frac{g^n}{g^n + 1},$$

$$p_{n+1}([B]) = \frac{1}{g^n + 1}.$$

To achieve the probability of misdiagnosis to be less than e:

$$\frac{1}{g^n + 1} < e.$$

Solving:

$$n = \frac{\log(1-e) - \log e}{\log g}.$$

As $e \approx 1$:

$$n = \frac{\log e}{\log g}.$$

With g=0.9 and e=0.01, n=43.7. Now consider the case where A is faulted. Until the fault is manifest, A will be producing a good value and the results will look the same as the case where B is faulted. Roughly, the fault will be manifest in, $$\frac{1}{2-2g} = 4.5,$$

samples. Thus, the expected cost of diagnosing circuit 90 of FIG. 9 is roughly 24.1. Our implementation obtains a similar result. Again it is seen that it is considerably more expensive to isolate intermittents further from the input(s).

8 Probing Strategy

To successfully isolate the faulty intermittent component, the diagnoser must propose measurements. In conventional model-based diagnosis, (following the myopic strategy, as is known in the art) the best probe to make next is the one which minimizes, $$H = -\sum_{D \in DIAGNOSES} p(D) \log p(D). \quad (4)$$

Even though the definition of p(c) is different than in conventional model-based diagnosis, we still want to probe those variables which maximize the likelihood of distinguishing among the possible intermittent faults. The goal is the same— to lower the posterior probability of failure for all but one of the components. A myopic minimum entropy approach will guide probing to this goal.

Figure 10:
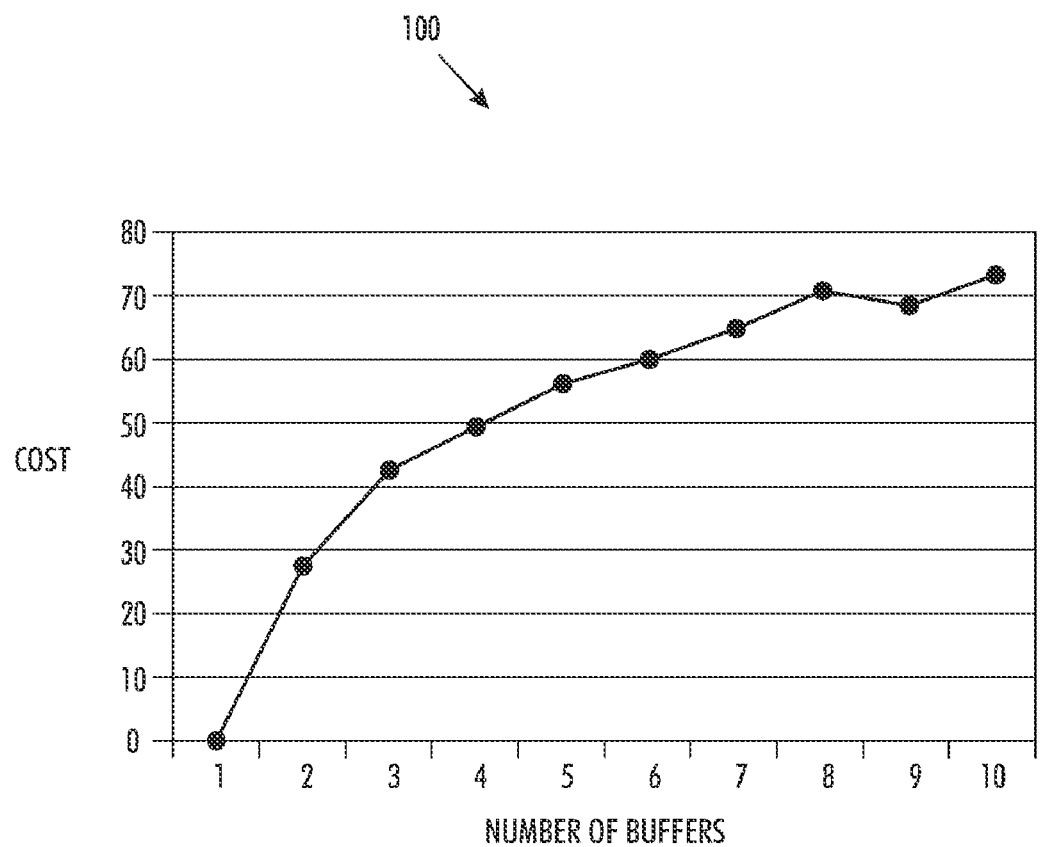
FIG. 10 illustrates a graph plotting the cost of isolating a single intermittent buffer, versus the number of buffers.

FIG. 10 illustrates a graph 100 which plots diagnostic cost (obtained from one simulation) of isolating a single intermittent buffer in a sequence of buffers using the minimum entropy strategy. The graph illustrates that, as is the case with persistent faults, groups of components are simultaneously exonerated so DC grows roughly logarithmic with circuit size. Note that the minimum entropy strategy is much better than the simple approach of Section 4.

If inputs vary, a slightly different approach is needed. For all but the simplest devices, it is computationally impractical to find the variable to measure next which provides the maximum expected information gain over all possible system inputs. Instead, a heuristic may be employed to ensure measuring the best variable which is directly adjacent to some remaining suspect component. This avoids the possible suboptimal situation where the particular new inputs make the proposed measurement insensitive to any of the faults (e.g., suppose the symptomatic value propagated through a known good And-gate, and if the other input of this And-gate were 1 when the fault was first observed and was 0 in later inputs, measuring the output of that And-gate would be useless for those input vectors, and it would take many samples to isolate the faulty component).

9 Benchmarks

This section presents results of an implementation of the present concepts as applied to some standard benchmarks in model-based diagnosis. These examples are drawn from a widely available combinatorial logic test suite from ISCAS-85.

Turning to Table 110 of FIG. 11, the first column (circuit) is the ISCAS-85 circuit name. The second column (components) is the number of distinct gates of the circuit. The remaining two columns are computed by hypothesizing each faulty component with a 1 switched to 0, and a 0 switched to a 1. For each fault, a single (constant) test-vector is found which gives rise to an observable symptom for one of the outputs. For each row, for each component, two simulations are performed. The next column (non i-cost) is the diagnostic cost to isolate the faulty non-intermittent component. The next column (i cost) is the diagnostic cost to isolate the intermittent component with misdiagnosis probability p<1−e, with e=0.1, g=0.9 and all components equally likely a priori. The final column (error) is the actual error rate observed in the simulation. We expect the actual error rate to approximate e=0.1.

A review of FIG. 11, which lists the average cost of diagnosing circuits in the ISCAS-85 benchmark show, not surprisingly, the number of samples needed to isolate intermittent faults is far greater than the cost of identifying non-intermittent faults.

The generalization to multiple intermittent faults is a direct generalization of the $\epsilon$-policy of Section 3 Extensions to the conventional framework to support intermittent faults. Let $M(C_p, C_n S, r, t)$ be the predicate where $S \subset C_p \subset COMPS$ which holds if r holds at time t if all components in S are outputting an incorrect value. More formally, $$M(C_p, C_n, S, r, t) = [C_n], OBS, SD, \bigwedge_{c \in S} \bar{o}(c), \bigwedge_{c \in C_p - S} o(c) \vdash T(r, t).$$

We can now define the observation function:

$$p_t(r) \mid D(C_p, C_n)) = \sum_{S \subset C_p \wedge M(C_p, C_n S, r, t)} \prod_{c \in S} (1 - g(c)) \prod_{c \in C_p - S} g(c).$$

r can represent any observation, but in all the examples in this discussion r is $x_i = v_k$. The computation required is exponential in the number of faults, not the number of components, so $p_t(x_i = v_k \mid D(C_p, C_n))$ can be evaluated efficiently. These can be evaluated directly with the ATMS/HTMS framework.

10 Extension to Multiple Persistent or Intermittent Faults

A persistent fault in component c can be modeled as an intermittent fault with g(c)=0.0 As the probing strategy is the same for non-intermittent and intermittent faults, no change is needed to the algorithms (except g(c) is more difficult to learn) to diagnose multiple simultaneous faults of both types. Modeling persistent faults as g(c)=0.0 has two drawbacks: (1) it is a "strong" fault model (i.e., the component always behaves incorrectly if it is faulted), and (2) it cannot distinguish between intermittent and non-intermittent faults in a single component. Therefore we introduce fault modes as is known in the literature. An inverter might fail with its output stuck at 1, or its output stuck at 0, or it might intermittently produce the wrong output:

$$INVERTER(x) \rightarrow OK(x) VSA0(x) VSA1(x) VU(x),$$

where OK (x) corresponds to the earlier ¬AB(x), $$OK(x) \rightarrow [in(x, t) = 0 \equiv out(x, t) = 1], \text{ and,}$$
$$SA0(x) \rightarrow [out(x) = 0],$$
$$SA1(x) \rightarrow [out(x) = 1],$$

and U(x) is treated as intermittent fault (just as AB(x) was earlier). The definition of diagnosis is generalized to be an assignment of modes to each component. For example, the diagnosis [O1] for the Full-Adder is represented as [U(O1)] (and G modes are not included). The approach of this application can be used to distinguish between an inverter stuck-at-1 and inverter being faulted, e.g., [SA1(X)] vs. [U(X)].

11 Related Work

There has been relatively little work in the model-based diagnosis community on intermittent faults. The approach presented here exploits the notion of exoneration—ruling out components as failing when observed to be behaving correctly. Previous work along this line are (1) the alibi notion, (2) corroboration, (3) converting simple single fault intermittent diagnosis tasks of combinational logic to dynamic programming. Another approach presents an intermittent diagnosis approach applicable to Discrete Event Systems.

Figure 12:
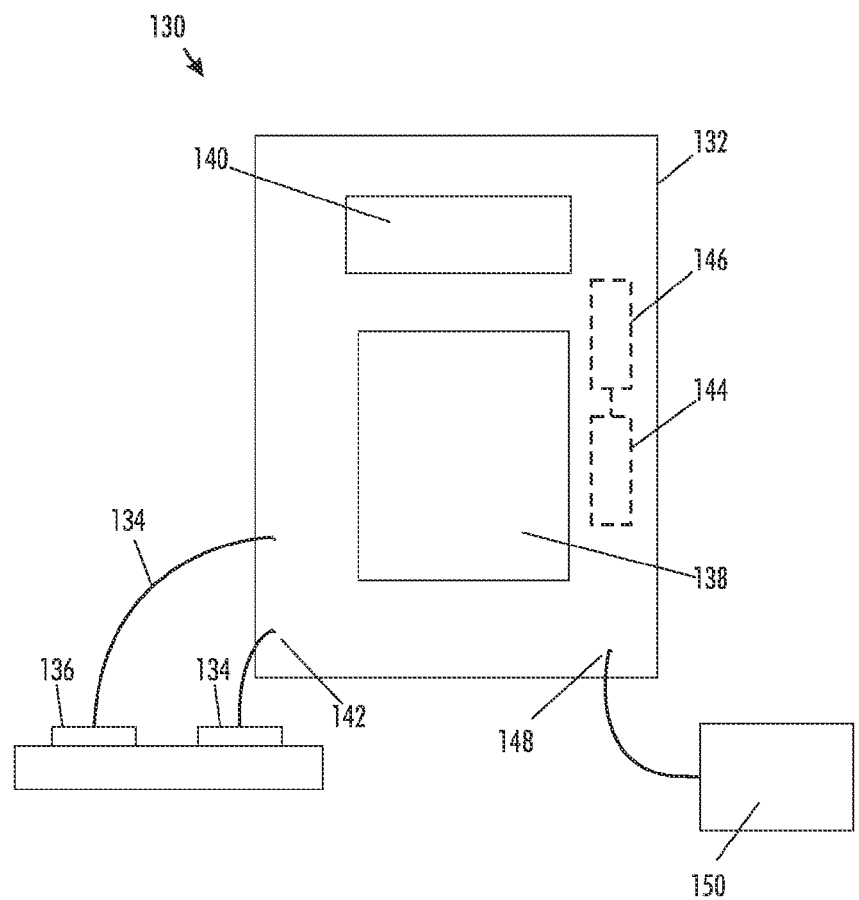
FIG. 12 is directed to one embodiment of a diagnostic device incorporating the concepts of the present application.

The preceding discussion focused on providing an improved system and method of diagnosing faults of a system under test. As previously mentioned, such diagnostic testing can be implemented in a wide range of areas. For example, as shown in FIG. 12, concepts disclosed in the present application may be embodied in a diagnostic device or system 130, including a body 132 and probes 134. Probes 134 are designed to be positioned in operative association with a device under test 136. Body may include an input 138 and an output 140. The input 138 can include an alphanumeric keypad, stylus, voice, or other input design or interface known to input data or instructions. Output 140 may be any sort of display to display the results of a diagnostic investigation. Body 132 may also include a secondary set of inputs 142, wherein information detected by probes 184 are automatically input into diagnostic device 130.

It is to be understood that body 132 includes computational capabilities including at least a processor 144 and memory 146, which permits the processing of software code, including code incorporating the concepts described herein. Still further, diagnostic device or system 130 may include output 148, for connection to an output device 150 to permit the printing of hardcopies of output reports regarding the results of the diagnostic investigation.

It is to be appreciated the above description may be implemented on customized diagnostic devices, and/or may be included as part of hand-held computers, laptops, desktops or other computing devices, including personal digital assistants. Still further, the diagnostic device or system 130 is intended only as examples of how the concepts of the present application may be implemented.

In another embodiment, FIG. 12 may not include probes 134, but rather the diagnostics may be undertaken on computer software operating on the diagnostic device, or associated with another device having computational capabilities.

Figure 13:
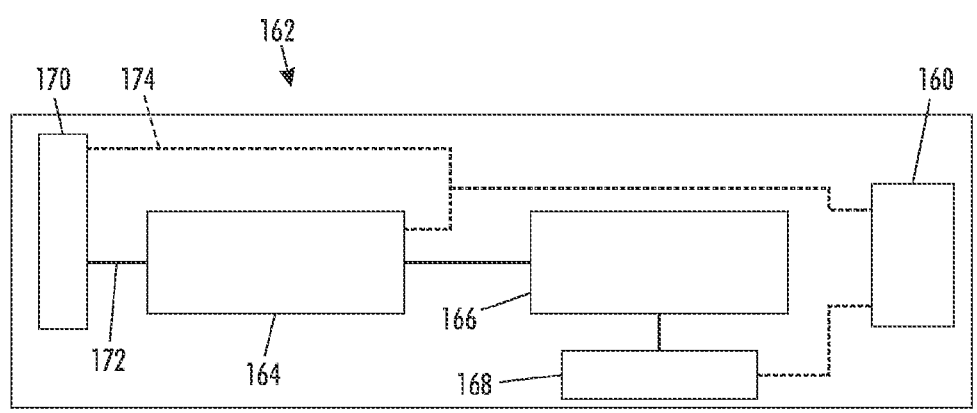
FIG. 13 is directed to an embodiment of an embedded diagnostic device.

In another embodiment illustrated in FIG. 13, the diagnostic device or system 160 is itself embedded as part of a larger overall system 162 which may, for example, include components 164-170 shown in operative connection with each other via solid lines 172. The diagnostic device or system 160, in turn is shown to be in operative connection with the components 164-170 via dotted lines 174. It is to be appreciated FIG. 13 is a high level example of a system in which a diagnostic device or system according to the present application may be used. The purpose of the diagnostic device or system 160 is to identify faults in the overall system 162 and initiate repairs without any human intervention. Examples of such overall systems would be reprographic equipment, automobiles, spacecraft, and airplanes, among others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for diagnosing any combination of persistent and intermittent faults or intermittent faults in a system, comprising:
    obtaining a measured behavior of a system by measuring and/or probing the system at particular points;
    investigating a predicted behavior of a modeled system of the system by drawing inferences based on at least conditional probabilities, prior observations and component models of the modeled system;
    comparing the predictions to their corresponding points in the system;
    determining if conflicts and/or deviations exist between the measured behavior and the predicted behavior;
    adjusting the conditional probabilities to more and more accurately reflect action faults in the system, so they will accept a possibility that a subsequent measuring and/or probing will produce a different value or output; and
    using the conflicts or deviations between the predicted behavior and the actual behavior to obtain a final result based on a new value or output,
    wherein intermittent failures arise from a stochastic physical process which is intermittent at any level of abstraction of the system model, and wherein the intermittent failures diagnosed by adjusting conditional probabilities so that they continue to accept the possibility the subsequent measuring and/or probing will produce a different value acts to avoid irreconcilable inconsistencies in the system.

2. The method of claim 1 further including, generating an error output when the final result is not reached within a predetermined number of measurements and/or probes.

3. The method according to claim 1 wherein the final result includes isolating the component causing the fault or faults.

4. The method according to claim 1 further including a next stage of measuring and/or probing, which includes determining a next location and/or point to measure and/or probe.

5. The method according to claim 1 wherein the system model, models the dynamic behavior of the system.

6. The method according to claim 5 wherein the dynamic behavior of the system is viewed as a sequence of non-temporal events.

7. A method of troubleshooting a real world system having multiple components, and containing any combination of intermittent or non-intermittent faults, the method comprising:
  generating a model of the real world system, the system model including multiple model components;
  associating with each model component of the system model, two probabilities, (1) a probability the real world component deviates from its design such that it may exhibit a malfunction, and (2) a conditional probability the faulted component malfunctions when observed;
  recalculating the conditional probabilities associated with possible fault causes, to guide a next stage of observation and/or measurement;
  undertaking a next stage of observation and/or measurement;
  determining when enough data has been obtained; and
  reaching a final result.

8. The method of claim 7 further including, generating an error output when an acceptable final result is not reached within a predetermined number of measurements and/or observations.

9. The method according to claim 7 wherein reaching the final result includes isolating the component causing the fault or faults.

10. The method according to claim 7 wherein the step of undertaking the next stage of observation and/or measurement includes determining a next location to observe and/or take a measurement.

11. The method according to claim 7 wherein the system model, models the dynamic behavior of the system.

12. The method according to claim 11 wherein the dynamic behavior of the system is viewed as a sequence of non-temporal events.

13. The method according to claim 7 wherein intermittent failures arise from a stochastic physical process which is intermittent at any level of abstraction of the system model.

14. A troubleshooting system implemented by a computing device which includes a processor, a memory an input and a display the troubleshooting system comprising:
  a diagnostic section configured to diagnose any combination of persistent and intermittent faults or intermittent faults in a real world multi-component system by,
  a probe section configured to obtain measured behaviors of the real world multi-component system by measuring or probing the real world multi-component system at particular points;
  an inference section configured to investigate predicted behaviors of a modeled system of the real world multi-component system by drawing inferences based on at least conditional probabilities, prior observations and component models;
  a comparison section configured to compare the predicted behaviors to their corresponding points in the real world multi-component system;
  determining if conflicts or deviations exist between the measured behaviors and the predicted behaviors;
  adjusting the conditional probabilities to more and more accurately reflect actual faults in the real world multi-component system, so they will accept a possibility that a subsequent measurement will produce a different value; and
  using the conflicts and/or deviations between the predicted behaviors and the actual measured behaviors to obtain a final result based on a new value or output,
  wherein intermittent failures arise from a stochastic physical process which is intermittent at any level of abstraction of the system model, and wherein the intermittent failures diagnosed by adjusting conditional probabilities so that they continue to accept the possibility the subsequent measuring and/or probing will produce a different value acts to avoid irreconcilable inconsistencies in the real world multi-component system.

15. The system according to claim 14 further including, generating an error output when an acceptable final result is not reached within a predetermined number of measurements and/or probes.

16. The system according to claim 14 wherein obtaining the final result includes isolating the component causing the fault or faults.

17. The system according to claim 14 wherein the step of undertaking a next stage of observation and/or measurement includes determining a next location to observe and/or take a measurement.

18. The system according to claim 14 wherein the system model, models the dynamic behavior of the system.

19. The system according to claim 18 wherein the dynamic behavior of the system is viewed as a sequence of non-temporal events.

20. The method of claim 1, wherein the system includes components, the components having inputs and at least some of the particular points which are measured and/or probed are the inputs of the components and ones of the multiple inputs of the system which are measured and/or probed.

21. The method according to claim 1, wherein the faults are at least one of multiple simultaneous persistent faults and multiple simultaneous intermittent faults.

* * * * *